May 8, 1923.

H. TAYLOR

VEHICLE SPRING

Filed Feb. 11, 1921

1,454,568

INVENTOR,
H. Taylor.
BY
Mason Fenwick & Lawrence
ATTORNEYS

Patented May 8, 1923.

1,454,568

UNITED STATES PATENT OFFICE.

HOWARD TAYLOR, OF PHILADELPHIA, PENNSYLVANIA, ASSIGNOR TO TAYLOR SPRING & EQUIPMENT COMPANY, OF PHILADELPHIA, PENNSYLVANIA.

VEHICLE SPRING.

Application filed February 11, 1921. Serial No. 444,202.

*To all whom it may concern:*

Be it known that I, HOWARD TAYLOR, a citizen of the United States, residing at Philadelphia, in the county of Philadelphia and State of Pennsylvania, have invented certain new and useful Improvements in Vehicle Springs; and I do hereby declare the following to be a full, clear, and exact description of the invention, such as will enable others skilled in the art to which it appertains to make and use the same.

This invention relates to new and useful improvements in springs and more particularly to a type of spring adapted for use on a well known type of motor car, the main object of the present invention being the provision of a spring provided with means whereby to eliminate the unnecessary shock or jar to the body of the car when passing over rough and uneven roads.

A further object of the present invention is the provision of a spring of the above type provided adjacent its ends with a suitable curvature and having arranged adjacent this curvature suitable rollers adapted to engage with the axle of the motor car when the wheels of the car come in contact with an uneven surface so that as the weight of the load bears down upon the spring, these rollers will engage with the axle and move thereon instead of having the spring coming in direct contact with the axle or having the strain of the load being borne entirely by the spring itself.

With the above and other objects in view the invention consists in the novel features of construction, combination and arrangement of parts hereinafter more fully set forth, pointed out in the claims and shown in the accompanying drawings in which:

Figure 1:
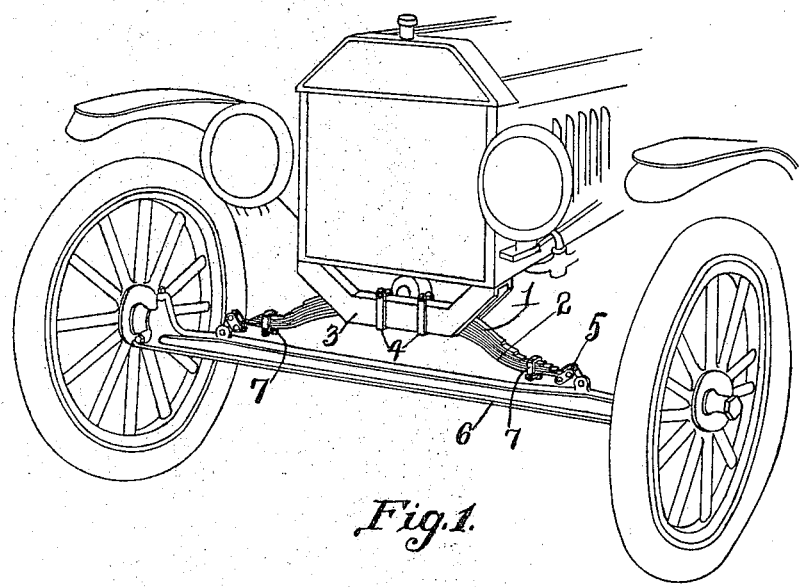
Figure 1 is a perspective view of a front portion of a motor vehicle illustrating my improved spring attached thereto.

In carrying out my invention I intend to do away with the old type of spring used on a well known make of motor vehicle, said type having its ends extending from the center of the spring down to the hanger on a direct angle and provide my improved spring which is generally indicated by the numeral 1, with a slight curvature as shown at 2 so as to give more resiliency to the central portion of the spring itself. In the present instance, I have illustrated my improved spring attached to the front hanger 3 of the motor vehicle by means of the usual clips 4 and the ends of the spring being pivotally connected to the hanger 5 arranged adjacent each end of the axle 6. These hangers 5 may be of the usual well known type and the ends of the spring secured thereto in the usual manner. It will be noted that by providing the curvature 2, in the spring adjacent each end thereof, it will lend more resiliency to the central portion of the body of the spring and in order to eliminate direct contact of the spring with the axle, when traveling over rough and uneven roads, a bracket 7 is mounted upon the spring at a point adjacent each end thereof and carries a roller 8 which is adapted to ride upon the axle 6 upon downward movement of the spring member.

Figure 2:
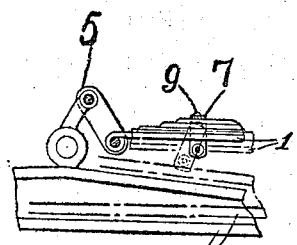
Fig. 2 is a detail front elevation illustrating the connection of one end of the spring and showing two positions of the spring with respect to the axle.
Figure 3:
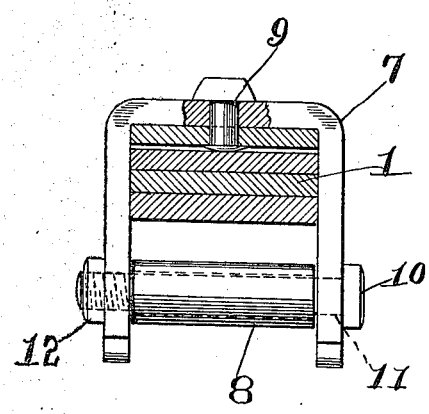
Fig. 3 is a transverse sectional view taken through the spring showing the roller and support in elevation.

The bracket 7 referred to above is of substantially U-shape, and the central portion thereof is riveted to one of the leaves of the spring by means of the rivet 9, said rivet extending through the cross portion of the bracket and the leaf of the spring as clearly illustrated in Figure 3. The roller 8 is mounted upon a transverse bolt 10 which is mounted within suitable openings 11 formed in the arm portions of the clips 7 and provided with a nut 12 whereby to retain the bolt 10 within the openings 11. The roller 8 is mounted upon the bolt 10 and disposed between the two arms 7 and directly beneath the spring member. The action of my improved spring is generally indicated in Figure 2 wherein the device is illustrated in full lines as in its normal position, and it will be noted that should the wheels of the vehicle strike an uneven surface, the load of the body upon the spring and the upward movement of the axle 6 will tend to bring the rollers 8 into contact with the upper face of the axle 6, said rollers moving outwardly away from each other on the axle so that the spring itself will not contact with the axle and thus absorb the shock or jar and not impart the same to the body of the vehicle. It will be noted that the position of the axle, the spring and the clips 7 is illustrated in dotted lines in a position to absorb the shock and jar caused by striking an uneven surface.

From the above description taken in connection with the accompanying drawings it will be readily apparent that I have provided a spring having new and improved means for absorbing the shock and jar which is generally imparted to the body of the vehicle when passing over uneven surfaces and wherein this device can be quickly and readily attached to a well known make of motor car at comparatively small expense.

I claim:

1. The combination with the axle and body of a vehicle, of a bowed spring having its terminals connected to the axle and having its middle portion connected to the body, inverted U-shape clips attached to said spring intermediate its center portion and terminals, and rollers detachably and rotatably mounted between the depending ends of said clips, whereby the strain on the terminal ends will be relieved when said ends are suddenly flexed upward.

2. The combination with the axle and body of a vehicle, of a bowed spring having its terminals connected to the axle and having its middle portion connected to the body, inverted U-shape clips attached to said spring intermediate its center portion and terminals, rollers mounted between the depending ends of said clips, said rollers being adapted to slidably engage the said axle thereby relieving the strain on the terminal ends when the said ends are suddenly flexed upwardly.

In testimony whereof I affix my signature.

HOWARD TAYLOR.